Sept. 27, 1927.                G. WOLF                1,643,732
            DEVICE FOR EXAMINING TUBES AND CAVITIES IN THE BODY
                         Filed April 14, 1927

Inventor:
Georg Wolf

Patented Sept. 27, 1927.

1,643,732

UNITED STATES PATENT OFFICE.

GEORG WOLF, OF BERLIN, GERMANY, ASSIGNOR TO THE FIRM GEORG WOLF, G. M. B. H., OF BERLIN, GERMANY.

DEVICE FOR EXAMINING TUBES AND CAVITIES IN THE BODY.

Application filed April 14, 1927, Serial No. 183,871, and in Germany April 6, 1926.

The present invention relates to devices for examining tubes and cavities in the human body, especially cystoscopes provided with two rinsing tubes, of which the one is connected to an inlet and the other to an outlet. The invention consists in this that in these devices one does not provide for the two rinsing tubes two separate closing cocks but one poly-way cock, which admits of closing and opening the inlets and outlets both separately and jointly. It has been proved that in the devices of the present type this construction is feasible by which not only the use of the rinsing appliance is considerably simplified but also a safer operation is attained than with the well-known devices of the present type in which two separate cocks for closing and opening the rinsing tubes had been provided.

Figure 1:
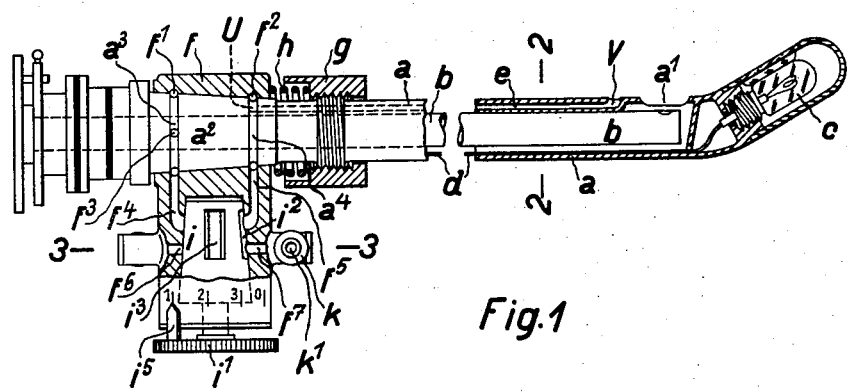
Figure 2:
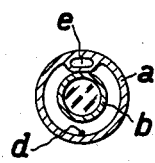
Figure 3:
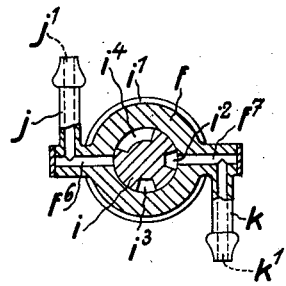

The annexed drawing shows as an example a cystoscope according to the invention. Fig. 1 is a longitudinal section through the cystoscope, Fig. 2 a cross section on an enlarged scale on the line 2—2 of Fig. 1 and Fig. 3 a cross section on the line 3—3 of Fig. 1.

The cystoscope shown consists of an outer tube $a$ and an inner tube $b$. The outer tube carries as an illuminating apparatus a glow lamp $c$ which is fed with electric current by an insulated electric line $d$ and the tube $a$. The inner tube contains the observing device whose objective lies behind an aperture $a^1$ of the outer tube. Between the inner tube and the outer tube is provided a rinsing tube $e$, beginning at U and ending at V. The remaining interval between the inner and the outer tube forms a second rinsing tube. The outer tube $a$ has a conical part $a^2$ on which is fitted a body $f$. With the aid of a nut $g$ this body is held fast on the tube. Between the nut $g$ and the body $f$ is inserted a spiral spring $h$. The body $f$ is thus rotatable about the axis of the cystoscope. The conical part $a^2$ of the tube $a$ is provided with two circular collecting grooves $a^3$ and $a^4$, opposite which there are like grooves $f^1$ and $f^2$ in the body $f$. Of these grooves $a^3$ is connected by a boring $f^3$ to the one rinsing tube, viz. the space between the inner and the outer tube, and $a^4$ with the rinsing tube $e$. In the body $f$ is rotatable a poly-way cock $i$, provided with a handle $i^1$. Moreover, the cock has three oblong openings $i^2$, $i^3$ and $i^4$. From the groove $f^1$ there leads a tube $f^4$ to the cock $i$ and from the groove $f^2$ leads a tube $f^5$ to the same place. Besides, the body $f$ contains tubes $f^6$ and $f^7$, of which the first leads from the cock $i$ to an inlet $j^1$, which is disposed in a tube extension $j$, and of which tubes the latter leads from the cock $i$ to an outlet $k^1$, which is in a tube extension $k$. The outer surface of the body $f$ carries a series of marks which are numbered 0, 1, 2 and 3. Facing these marks is an index $i^5$ fixed on the handle $i^1$, so that the cock $i$ can be adjusted according to the series of marks.

In the position shown in which the index faces the mark numbered 1, only the outlet $k^1$ is open. In this case the liquid may be let off through the tube $e$, the grooves $a^4$ and $f^2$, the tube $f^5$, the opening $i^2$ and the boring $f^7$. If the cock $i$ be so adjusted that the index $i^5$ is set to the mark numbered 2, only the inlet $j^1$ is open. The liquid may then be conducted to the cavity in the body through the tube $f^6$, the opening $i^4$, the tube $f^4$, the grooves $a^3$ and $f^1$, the boring $f^3$, the interval between the inner tube $b$ and the outer tube $a$ and through the opening $a^1$. If the index $i^5$ be set to the mark numbered 3, both openings $j^1$ and $k^1$ are open, so as to admit of rinsing the cavity in the body, whereby the liquid is admitted in the same way as described above and let off through the tube $e$, the grooves $a^4$ and $f^2$, the tube $f^5$, the opening $i^3$ and the tube $f^7$. In the position denoted by zero both inlet and outlet are closed.

I claim:

Device for examining tubes and cavities in the human body, comprising an outer tube, an inner tube containing optical means adapted to present to the observer an image of the part to be examined, a third tube interposed between the outer and the inner tube and admitting of letting a rinsing fluid pass through, and a poly-way cock, adapted to close and open the third tube and the space of the outer tube, which is not occupied by the inner tube and the third tube, both separately and conjointly.

GEORG WOLF.